US010603739B2

(12) United States Patent
Muscat-Tyler et al.

(10) Patent No.: US 10,603,739 B2
(45) Date of Patent: Mar. 31, 2020

(54) ANGLED PLASMA CUTTING TORCH

(71) Applicant: Lincoln Global, Inc., Santa Fe Springs, CA (US)

(72) Inventors: Robin Muscat-Tyler, Campbellville (CA); Christopher Williams, Newcastle upon Tyne (GB)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 256 days.

(21) Appl. No.: 15/797,010

(22) Filed: Oct. 30, 2017

(65) Prior Publication Data

US 2018/0161911 A1    Jun. 14, 2018

Related U.S. Application Data

(60) Provisional application No. 62/431,991, filed on Dec. 9, 2016.

(51) Int. Cl.
| | | |
|---|---|---|
| *B23K 10/00* | (2006.01) | |
| *H05H 1/34* | (2006.01) | |
| *H05H 1/28* | (2006.01) | |

(52) U.S. Cl.
CPC .............. *B23K 10/00* (2013.01); *H05H 1/28* (2013.01); *H05H 1/34* (2013.01); *H05H 2001/3463* (2013.01)

(58) Field of Classification Search
CPC ... H05H 1/34; H05H 1/28; H05H 1/26; B23K 10/00
USPC ............ 219/121.39, 121.45, 121.46, 121.48, 219/121.5, 121.51, 121.52
See application file for complete search history.

(56) References Cited

U.S. PATENT DOCUMENTS

| | | | | |
|---|---|---|---|---|
| 4,877,937 A | * | 10/1989 | Muller | .................... B05B 7/226 219/121.59 |
| 5,208,441 A | | 5/1993 | Broberg | |
| 5,510,595 A | * | 4/1996 | Gainand | .............. B23Q 35/128 219/124.34 |
| 8,525,067 B2 | * | 9/2013 | Muscat-Tyler | ......... B23K 10/00 219/121.44 |

(Continued)

FOREIGN PATENT DOCUMENTS

EP    2 942 144 A1    11/2015

OTHER PUBLICATIONS

Extended European Search Report from Corresponding European Application No. 17206394.3; dated May 3, 2018; pp. 1-9.

*Primary Examiner* — Mark H Paschall
(74) *Attorney, Agent, or Firm* — David J. Muzilla (57) ABSTRACT

Embodiments of arc plasma cutting torches are disclosed. In one embodiment, an eccentric plasma cutting torch includes an upper portion and a lower portion. The lower portion is angled on one side along a length $\lambda$ which results from continuously smaller cross sections of the lower portion which are biased towards a non-angled side of the torch. As a result, a central axis of an electrode of the torch, used for cutting, is biased by an offset from a central axis of the upper portion towards the non-angled side of the torch. Such an offset allows for a torch tip region of the torch to get closer into otherwise difficult-to-access portions of workpieces for cutting. Furthermore, the overall dimensions of the torch are configured such that cooling elements within the torch dissipate enough heat to keep the torch in a stable operating condition during a cutting operation.

20 Claims, 8 Drawing Sheets

(56) References Cited

U.S. PATENT DOCUMENTS

| | | | |
|---|---|---|---|
| 8,946,582 B1* | 2/2015 | Bong | B23K 9/18 |
| | | | 219/73.1 |
| 9,107,282 B2* | 8/2015 | Twarog | H05H 1/34 |
| 2010/0147808 A1 | 6/2010 | Tsai et al. | |
| 2013/0193118 A1 | 8/2013 | Severance, Jr. et al. | |
| 2015/0181686 A1* | 6/2015 | Schulze | H05H 1/34 |
| | | | 219/121.51 |
| 2018/0139833 A1* | 5/2018 | Patel | H05H 1/34 |

* cited by examiner

PRIOR ART

ANGLED PLASMA CUTTING TORCH

CROSS REFERENCE TO RELATED APPLICATIONS/INCORPORATION BY REFERENCE

This U.S. patent application claims priority to and the benefit of U.S. provisional patent application Ser. No. 62/431,991 filed on Dec. 9, 2016, which is incorporated herein by reference in its entirety.

FIELD

Embodiments of the present invention relate to systems and apparatus related to plasma cutting, and more specifically to arc plasma cutting using a torch assembly in robotic applications.

BACKGROUND

Plasma cutting involves the use of a high current plasma jet which generates a large amount of heat during a cutting process when cutting through workpieces of, for example, a steel plate or a steel I-beam. The plasma cutting torch is cooled during the cutting process to prevent components of the plasma cutting torch from melting down. The use of plasma cutting systems in various industries has grown over time and, as a result, there is an increasing need to be able to make cuts along portions of workpieces that are difficult to access with present day concentrically configured plasma cutting torches while maintaining adequate cooling of the torch.

SUMMARY

Embodiments of the present invention include equipment related to plasma cutting torches and components thereof which are improved over known torches with respect to being able to cut along portions of workpieces that are difficult to access with conventional plasma cutting torches. Exemplary embodiments of plasma cutting torches are described herein which deviate from the conventional concentric design by having portions which are angled and/or offset with respect to each other to allow for accessing otherwise difficult-to-access portions of workpieces for cutting. The angled and/or offset torch configurations also maintain proper cooling, via cooling fin/reservoir configurations, to prevent degradation and/or meltdown of the torch components due to heat generation during a cutting process. Other types of torches such as, for example, arc welding torches may also take advantage of the angled and/or offset configurations disclosed herein.

In one embodiment, an eccentric plasma cutting torch is configured to get closer in toward otherwise difficult-to-access portions of workpieces for cutting. The torch includes an upper portion having a first central axis. The upper portion is configured to attach to an arm of a robot. The torch also includes a lower portion connected to the upper portion. The lower portion includes a torch tip region providing a plasma outlet opening, an angled side along a length of the lower portion, and a non-angled side along the length of the lower portion. The angled side results from continuously smaller cross sections of the lower portion along the length which are biased towards the non-angled side. The torch further includes an electrode within the lower portion having a second central axis. The first central axis of the upper portion and the second central axis of the electrode are both along a same longitudinal dimension. The second central axis is spatially offset from the first central axis, towards the non-angled side of the lower portion of the torch, and is aligned with the plasma outlet opening. The continuously smaller cross sections of the lower portion may be elliptical (e.g., circular) in shape. In one embodiment, the torch includes a torque motor device secured to at least part of the upper portion of the torch. The torque motor device is controlled to maintain the non-angled side of the lower portion perpendicular to a face of a workpiece being cut during a cutting operation. The lower portion may include at least one of a cutting gas inlet channel or a shielding gas inlet channel. In one embodiment, the lower portion includes a cooling fluid inlet channel, a coolant reservoir, and a plurality of cooling fins. The torch may also include a retaining cap.

In one embodiment, a plasma cutting torch is configured to get closer in toward otherwise difficult-to-access portions of workpieces for cutting. The torch includes an upper portion having a first central axis. The upper portion is configured to attach to an arm of a robot. The torch also includes a lower portion connected to the upper portion and having a torch tip region providing a plasma outlet opening. The torch further includes an electrode within the lower portion having a second central axis. The second central axis is at a non-zero degree angle to the first central axis and is aligned with the plasma outlet opening. In one embodiment, the lower portion includes at least one of a cutting gas inlet channel or a shielding gas inlet channel. The lower portion may also include a cooling fluid inlet channel, a coolant reservoir, and a plurality of cooling fins. The torch may also include a retaining cap. In some embodiments, the non-zero angle is between 10 degrees and 20 degrees. In other embodiments, the non-zero angle is between 20 degrees and 30 degrees. In still other embodiments, the non-zero angle is at least 30 degrees.

In one embodiment, a plasma cutting torch is configured to get closer in toward otherwise difficult-to-access portions of workpieces for cutting. The torch includes an upper portion having a first central axis and a second central axis. The second central axis is at a first non-zero angle to the first central axis to form a bend in the upper portion. The upper portion is configured to attach to an arm of a robot. The torch also includes a lower portion connected to the upper portion and having a torch tip region providing a plasma outlet opening. The torch further includes an electrode within the lower portion having a third central axis. The third central axis is at a second non-zero degree angle to the second central axis and is aligned with the plasma outlet opening. In one embodiment, the lower portion includes at least one of a cutting gas inlet channel or a shielding gas inlet channel. The lower portion may also include a cooling fluid inlet channel, a coolant reservoir, and a plurality of cooling fins. The torch may also include a retaining cap. In some embodiments, at least one of the first non-zero angle and the second non-zero angle is between 10 degrees and 20 degrees. In other embodiments, at least one of the first non-zero angle and the second non-zero angle is between 20 degrees and 30 degrees. In still other embodiments, at least one of the first non-zero angle and the second non-zero angle is at least 30 degrees.

Numerous aspects of the general inventive concepts will become readily apparent from the following detailed description of exemplary embodiments, from the claims and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

In general, plasma arc cutting torches may include an electrode and a nozzle in which a nose end of the electrode is supported such that the end of the nose of the electrode faces an end wall of the nozzle which has a plasma outlet opening there-through. The electrode and nozzle may be relatively displaceable between a position in which the electrode contacts the end wall of the nozzle and a position in which the electrode is spaced an operating distance from the end wall, whereby a pilot arc can be created as the electrode moves away from the end wall to its operating position. Alternatively, the electrode and nozzle can be fixed relative to one another, whereby the torch is started by the use of high frequency or other known starting procedures.

In any event, the end wall of the nozzle and the end face of the electrode provide a gas chamber into which a plasma or arc gas (cutting gas) is supplied and from which a plasma jet is emitted through the outlet opening when an arc current flows between the electrode and nozzle. A swirling motion may be imparted to the plasma gas upstream of the gas chamber for cooling purposes and in an effort to keep the emitted plasma jet focused on line with the axis of the electrode. A shielding gas and cooling fluid may also be supplied to the plasma arc cutting torch. Various hoses (tubes) and cables (e.g., in the form of a harness of leads) may be provided for providing the cutting gas, the shielding gas, the cooling fluid, and electric current to the plasma arc cutting torch. Various embodiments of a plasma arc cutting torch may include, for example, a torch body, a water cooling tube, an electrode, a plasma gas distributor, a nozzle, a retaining cap, a shield cap, and a shield cup. Other elements are possible as well, in accordance with other embodiments.

Figure 1:
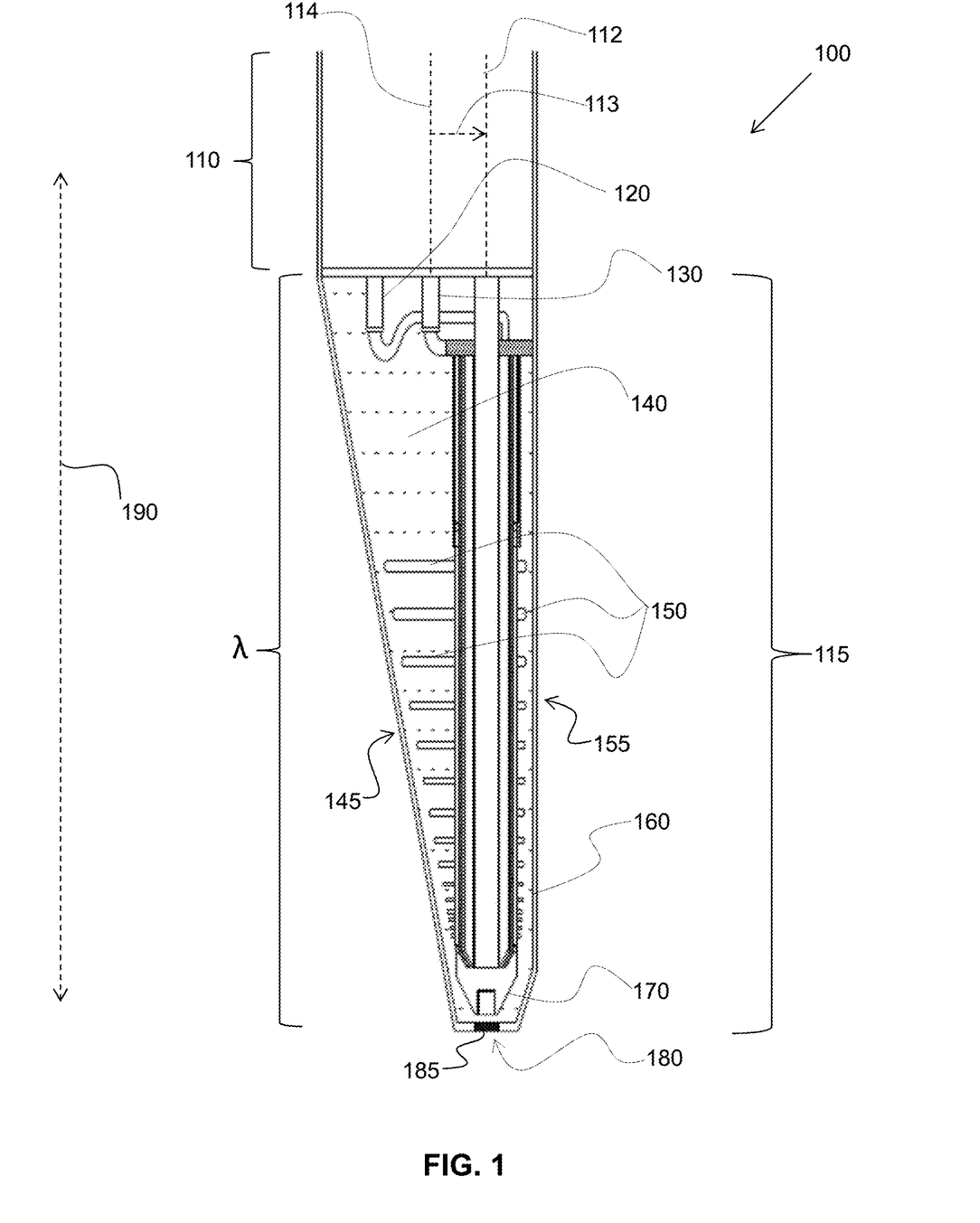
FIG. 1 illustrates a first embodiment of a plasma cutting torch which deviates from a conventional concentric configuration.

Referring now to the drawings, which are for the purpose of illustrating exemplary embodiments of the present invention only and not for the purpose of limiting same, FIG. 1 illustrates a first embodiment of a plasma cutting torch 100 which deviates from a conventional concentric configuration. The plasma cutting torch 100 of FIG. 1 is an eccentric or offset torch design having an upper portion 110 and a lower portion 115 that includes a cutting gas inlet channel 120, a cooling fluid inlet channel 130, a coolant reservoir 140, a plurality of cooling fins 150, a retaining cap 160, an electrode 170, and a torch tip region 180 providing a plasma outlet opening 185. In one embodiment, a shielding gas inlet channel (similar to the cutting gas inlet channel 120) may be provided as well. The upper portion 110 is connected to the lower portion and is configured to attach to an arm of a robot (e.g., via a clamping mechanism, e.g., see FIG. 4) and has a central axis 114. The lower portion 115 is angled along a length λ of the torch 100, forming an angled side 145.

Figure 4:
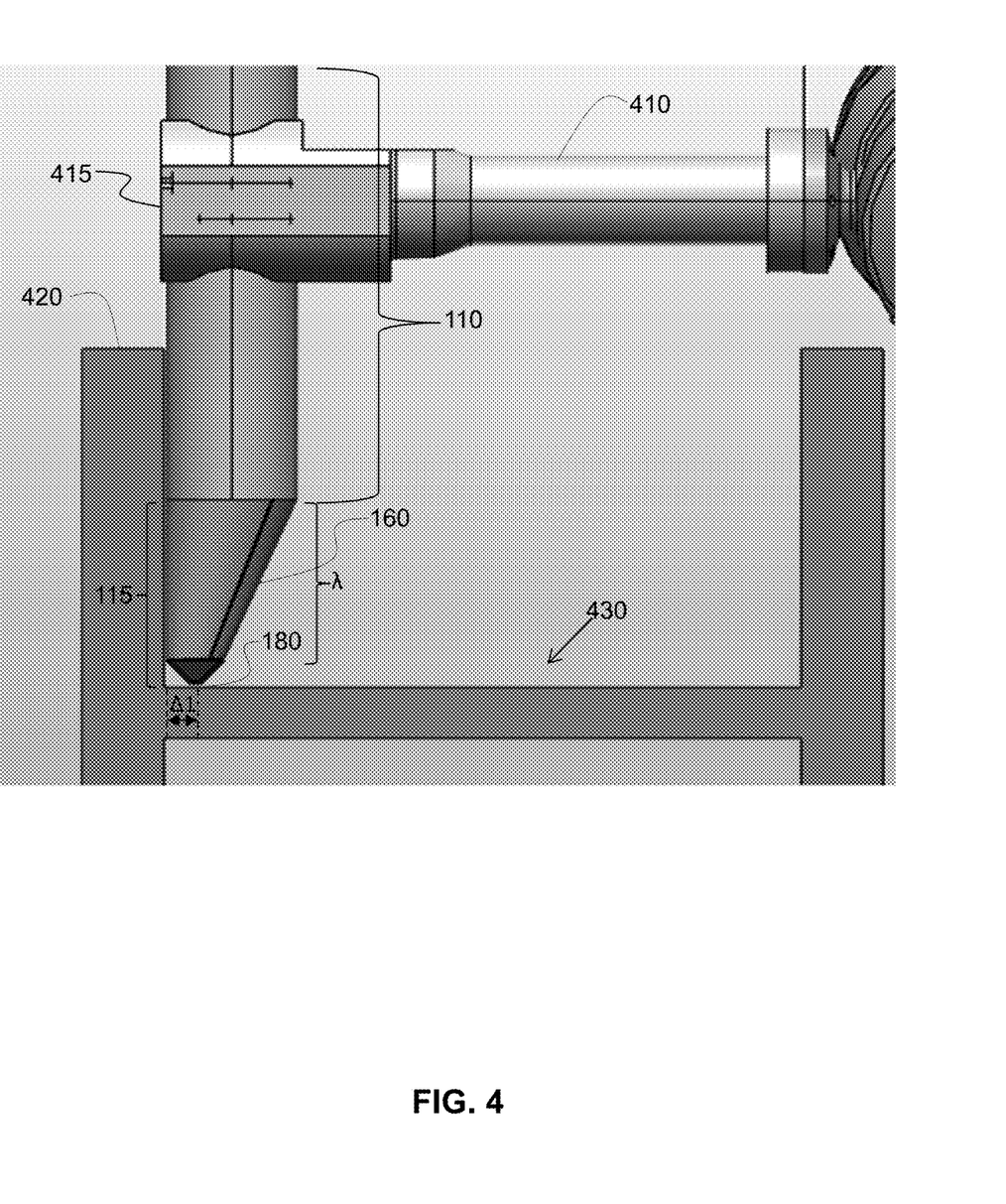
FIG. 4 illustrates an embodiment of the plasma cutting torch of FIG. 1 attached to a robot arm and butting up against a leg of an I-beam.

In accordance with one embodiment, the angled lower portion 115 results from continuously smaller elliptical (e.g., circular) cross sections of the lower portion 115 (in the direction towards the torch tip region 180) which are biased towards one side (a non-angled side 155) of the torch 100. The nature of the continuously smaller elliptical cross sections of the lower portion 115 along the length λ are better illustrated by the shading of a lower portion 115 of an embodiment of the torch 100 as shown in FIG. 4. As a result, a central axis 112 of the electrode 170 and the torch tip region 180 used for cutting are biased by a spatial offset 113 from the central axis 114 of the upper portion 110 towards the non-angled or flat side 155 of the torch 100. Such a bias or offset 113 allows for the torch tip region 180 to get closer into otherwise difficult-to-access portions of workpieces for cutting (e.g., see FIGS. 6A-6B). The central axis 112 is aligned with the plasma outlet opening 185 as shown in FIG. 1, in accordance with one embodiment. The central axis 112 of the electrode 170 and the central axis 114 of the upper portion are both along a same longitudinal dimension 190. The overall dimensions of the plasma cutting torch 100 are configured such that the cooling fins 150 and the coolant (e.g., liquid water) in the coolant reservoir 140 dissipate enough heat to keep the torch 100 in a stable operating condition during a cutting operation.

Figure 2:
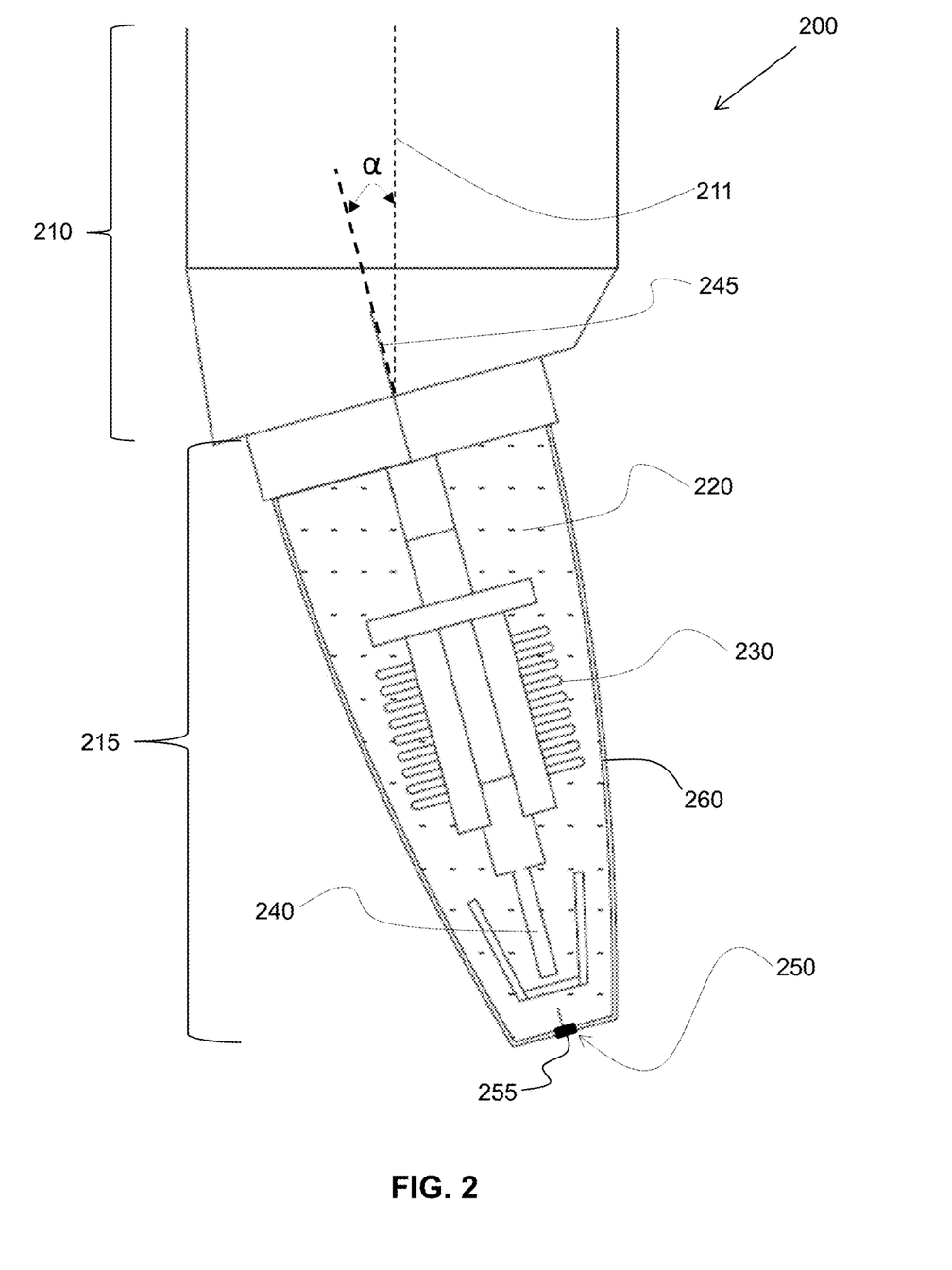
FIG. 2 illustrates a second embodiment of a plasma cutting torch which deviates from a conventional concentric configuration.

FIG. 2 illustrates a second embodiment of a plasma cutting torch 200 which deviates from a conventional concentric configuration. The plasma cutting torch 200 of FIG. 2 is an angled torch design having an upper portion 210 and a lower portion 215 that includes a cutting gas inlet channel similar to the channel 120 of FIG. 1, a cooling fluid inlet channel similar to the channel 130 of FIG. 1, a coolant reservoir 220, a plurality of cooling fins 230, an electrode 240, and a torch tip region 250 providing a plasma outlet opening 255. The lower portion 215 is connected to the upper portion 210, and the upper portion 210 is configured to attach to an arm of a robot (e.g., via a clamping mechanism, e.g., see FIG. 4). In one embodiment, a shielding gas inlet channel (similar to the cutting gas inlet channel 120 of FIG. 1) may be provided as well. A retaining cap 260 may also be provided.

In the plasma cutting torch 200, the entire lower portion 215 is angled from the upper portion 210 such that a central axis 245 of the electrode 240 is at an angle α (a non-zero degree angle) to the central axis 211 of the upper portion 210 and is aligned with the plasma outlet opening 255. As a result, the electrode 240 and the torch tip region 250 used for cutting are angled with respect to the upper portion 210 to allow for the torch tip region 250 to get closer into otherwise difficult-to-access portions of workpieces for cutting. In some embodiments, the angle α is between 10 degrees and 20 degrees. In other embodiments, the angle α is between 20 degrees and 30 degrees. In still other embodiments, the angle α is 30 degrees or greater. The overall dimensions of the plasma cutting torch 200 are configured such that the cooling fins 230 and the coolant (e.g., liquid water) in the coolant reservoir 220 dissipate enough heat to keep the torch 200 in a stable operating condition during a cutting operation.

Figure 3:
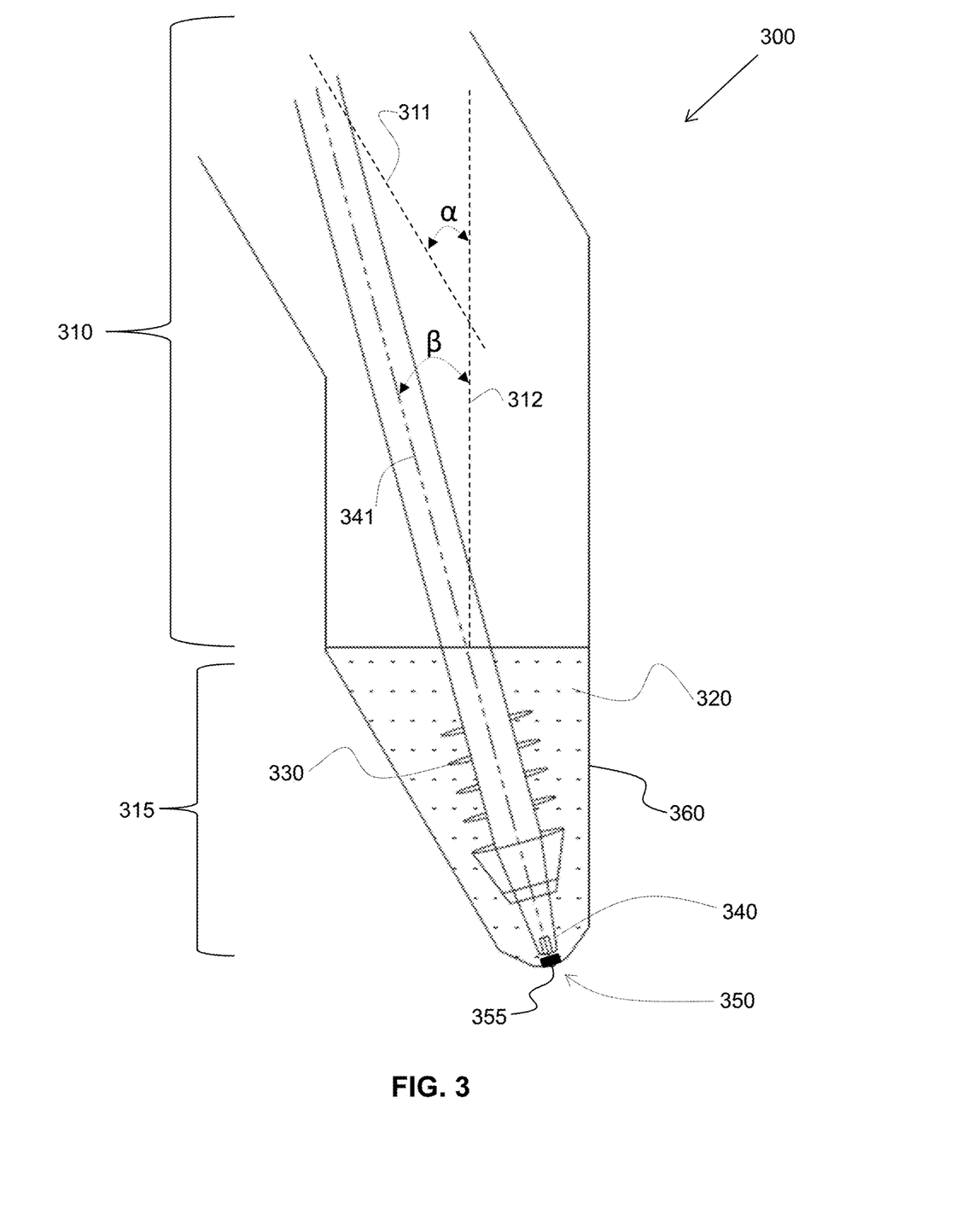
FIG. 3 illustrates a third embodiment of a plasma cutting torch which deviates from a conventional concentric configuration.

FIG. 3 illustrates a third embodiment of a plasma cutting torch 300 which deviates from a conventional concentric configuration. The plasma cutting torch 300 of FIG. 3 is a double-angled torch design having an upper portion 310 and a lower portion 315 that includes a cutting gas inlet channel similar to the channel 120 of FIG. 1, a cooling fluid inlet channel similar to the channel 130 of FIG. 1, a coolant reservoir 320, a plurality of cooling fins 330, an electrode 340, and a torch tip region 350 providing a plasma outlet opening 355. The upper portion 310 is connected to the lower portion 315 and is configured to attach to an arm of a robot (e.g., via a clamping mechanism, e.g., see FIG. 4). In one embodiment, a shielding gas inlet channel (similar to the cutting gas inlet channel 120 of FIG. 1) may be provided as well. A retaining cap 360 may also be provided.

In the plasma cutting torch 300, the upper portion 310 includes a bend creating an angle α (a first non-zero angle) between a first central axis 311 and a second central axis 312 of the upper portion 310. The lower portion 315 is similar to the lower portion 115 of FIG. 1, except that a central axis 341 of the electrode 340 is at an angle β (a second non-zero angle) to the central axis 312 of the upper portion 310. The central axis 341 is aligned with the plasma outlet opening 355. As a result, the electrode 340 and the torch tip region 350 used for cutting are angled with respect to two central axes of the upper portion 310 to allow for the torch tip region 350 to get closer into otherwise difficult-to-access portions of workpieces for cutting. In some embodiments, at least one of the first non-zero angle α and the second non-zero angle β is between 10 degrees and 20 degrees. In other embodiments, at least one of the first non-zero angle α and the second non-zero angle β is between 20 degrees and 30 degrees. In still other embodiments, at least one of the first non-zero angle α and the second non-zero angle β is 30 degrees or greater. The overall dimensions of the plasma cutting torch 300 are configured such that the cooling fins 330 and the coolant (e.g., liquid water) in the coolant reservoir 320 dissipate enough heat to keep the torch 300 in a stable operating condition during a cutting operation.

Figure 5:
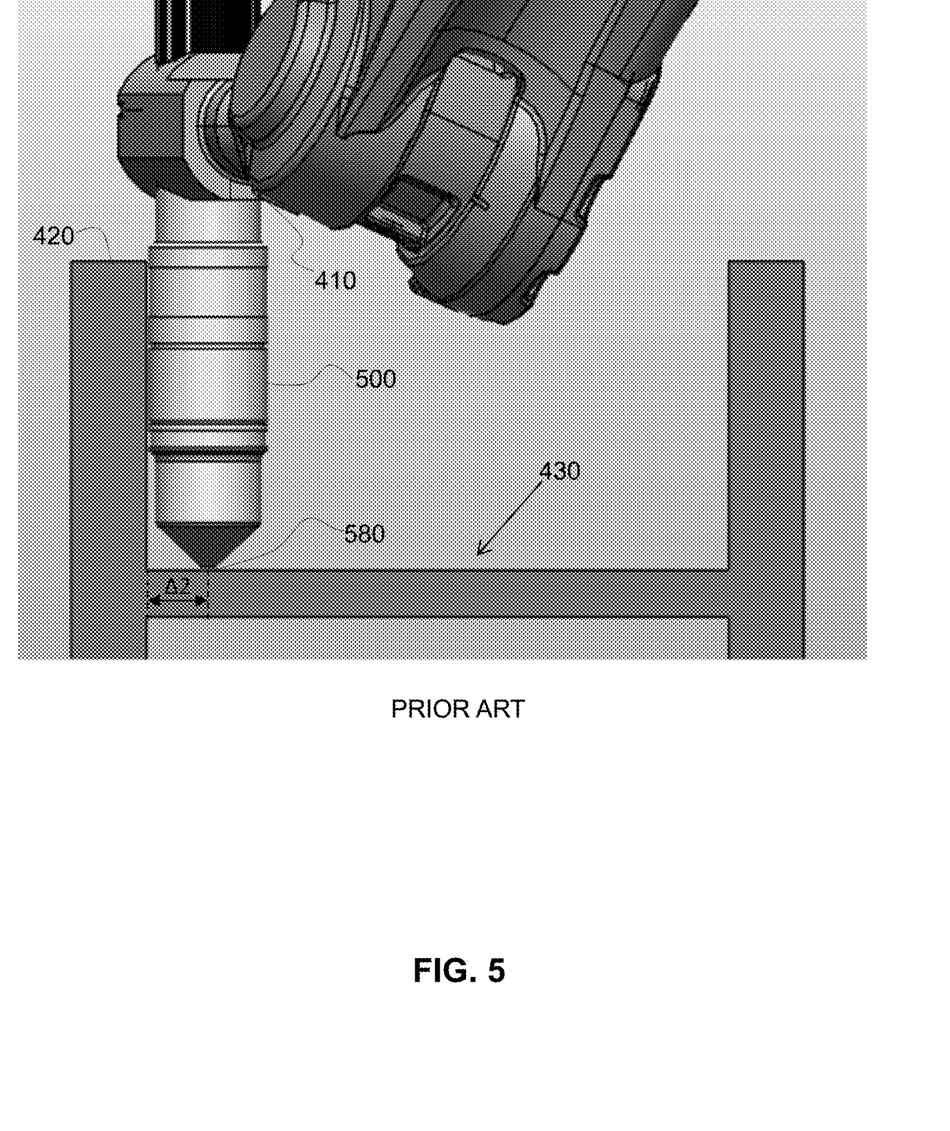
FIG. 5 illustrates a conventional plasma cutting torch attached to a robot arm and butting up against a leg of an I-beam.

FIG. 4 illustrates an embodiment of the plasma cutting torch 100 of FIG. 1, attached to a robot arm 410 via a clamping mechanism 415 and butting up against a leg 420 of an I-beam 430. The upper portion 110 and the lower portion 115 of the torch 100 are shown. The distance between the torch tip region 180 and the inner wall of the leg 420 is Δ1. Similarly, FIG. 5 illustrates a conventionally concentric plasma cutting torch 500 attached to a robot arm 410 and butting up against a leg 420 of an I-beam 430. The distance between the torch tip region 580 of the torch 500 and the inner wall of the leg 420 is Δ2. As can be seen, because of the novel design of the torch 100, the distance Δ1 is substantially less than the distance Δ2, allowing for the torch tip region 180 of the embodiment of the torch 100 to get in closer to the corner of the I-beam 430 than the torch tip region 580 of the conventional plasma cutting torch 500.

Figure 6A:
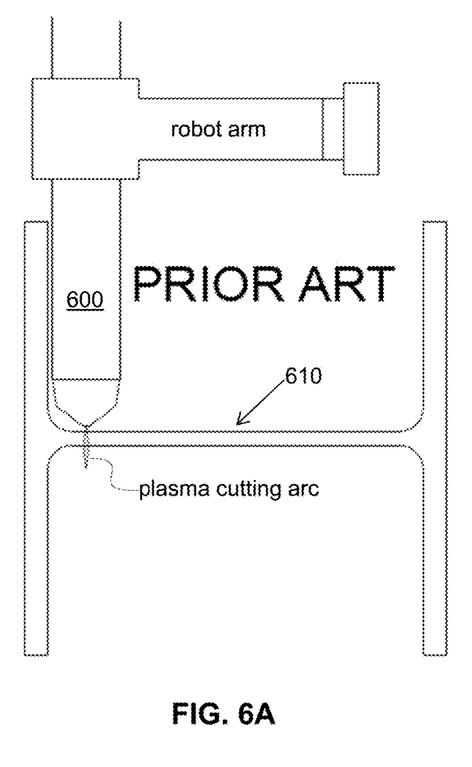
FIGS. 6A-6B illustrate a comparison between a conventionally concentric plasma cutting torch and an embodiment of the plasma cutting torch of FIG. 1 with respect to cutting along a corner of an I-beam.
Figure 6B:
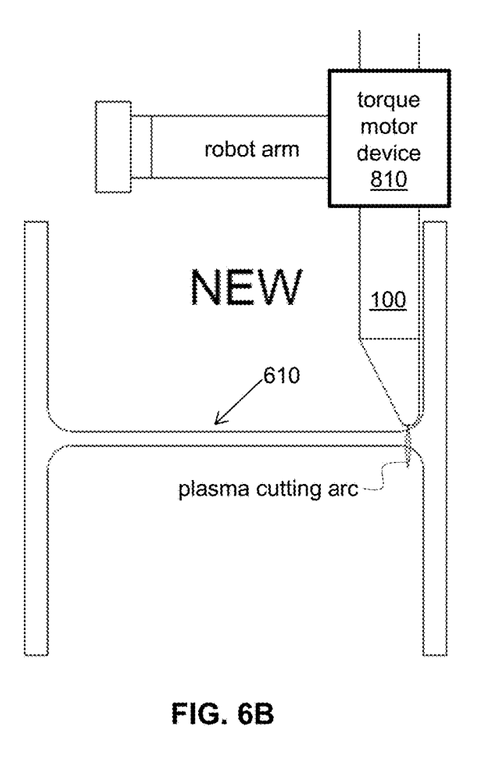
Figure 7:
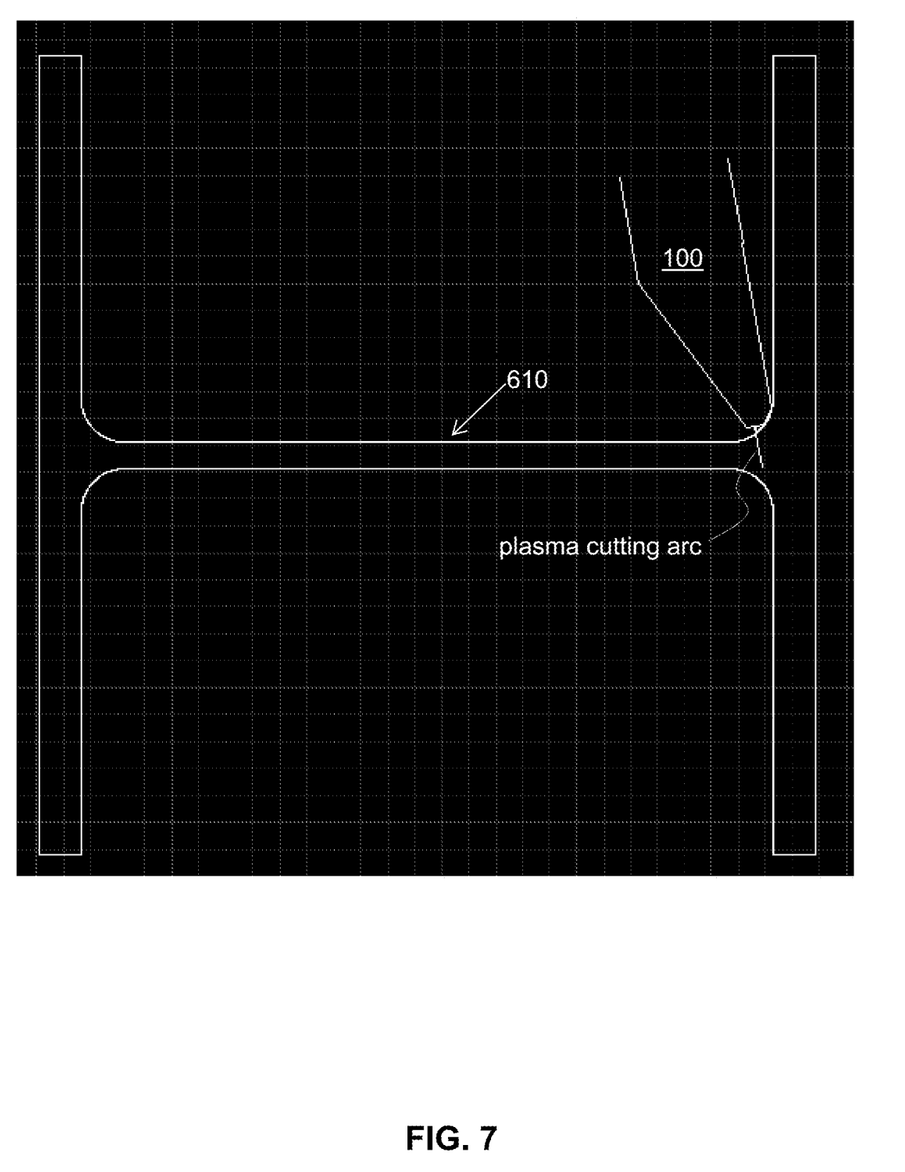
FIG. 7 illustrates an embodiment of the plasma cutting torch of FIG. 1 in a rotated position as it cuts along a corner of an I-beam.

FIGS. 6A-6B illustrate a comparison between a conventionally concentric plasma cutting torch 600 and an embodiment of the plasma cutting torch 100 of FIG. 1 with respect to cutting along a rounded corner of an I-beam 610. As can be seen in FIG. 6B, a much closer cutting approach into the rounded corner is achieved by the plasma cutting torch 100 than by the conventional torch 600 in FIG. 6A. FIG. 7 illustrates an embodiment of the plasma cutting torch 100 of FIG. 1 in a rotated position as it cuts along a rounded corner of the I-beam 610. The closer approach provided by the eccentric torch design of FIG. 1 provides a more consistent and clean cut into the rounded corner of the I-beam 610. The eccentric torch design of FIG. 1 may also allow for closer approaches, with respect to other types of workpieces as well, than the conventional concentric torch design. Similarly, the angled and double-angled torch designs of FIG. 2 and FIG. 3, respectively, may allow for closer approaches, with respect to various types of workpieces, than the conventional concentric torch design.

Figure 8:
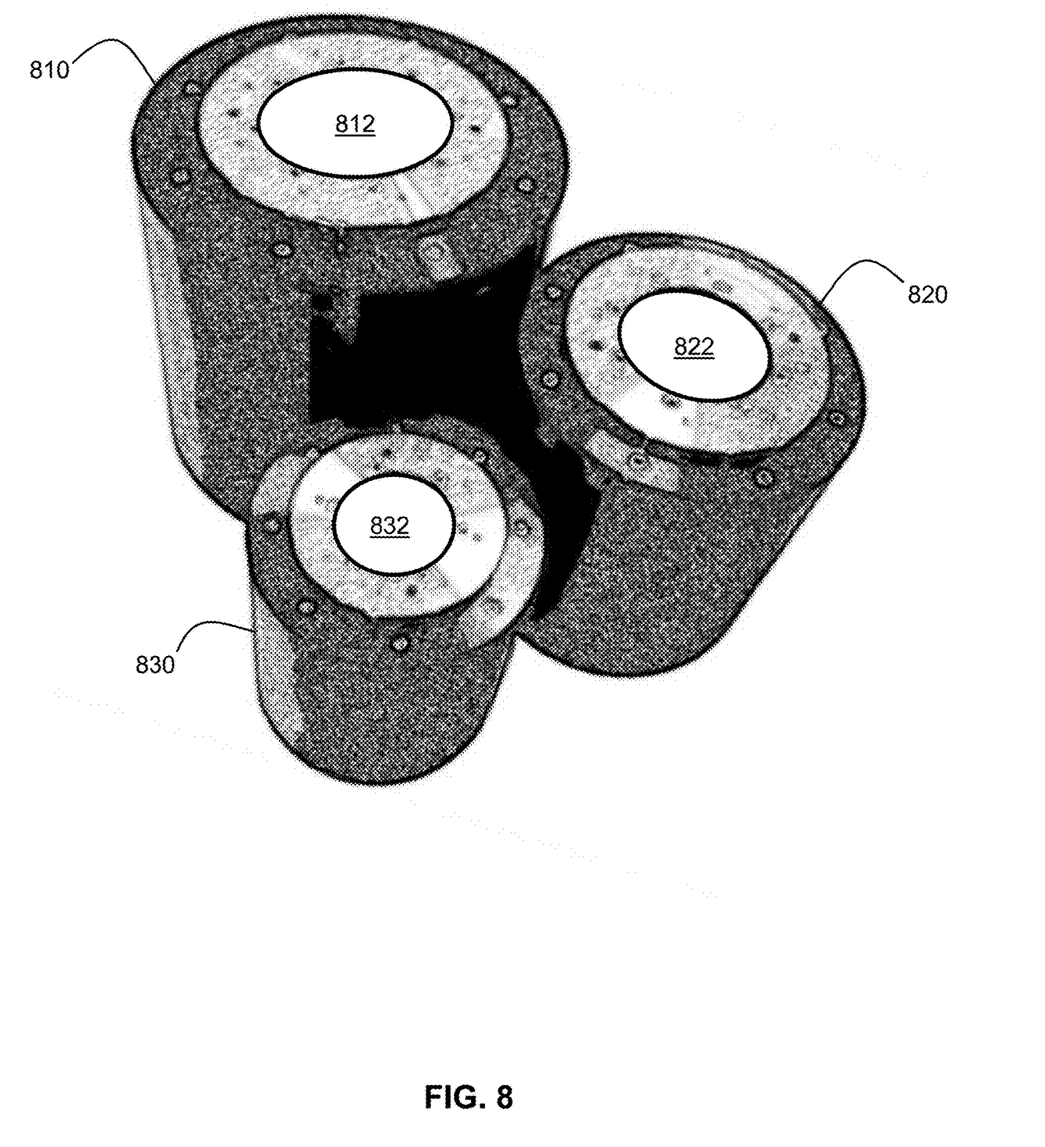
FIG. 8 illustrates several embodiments of torque motor devices being of various sizes and diameters.

In accordance with one embodiment, a torque motor device is provided which is connected to the upper portion of the plasma cutting torch. FIG. 8 illustrates several embodiments of torque motor devices 810, 820, and 830 being of various sizes and diameters to accommodate different torch sizes. The torque motor devices are of relatively low speed (e.g., 600 rpm in one embodiment). Such torque motor devices are well known in the art. The torque motor devices each have a central passage (e.g. 812, 822, and 832) that an upper portion of a plasma cutting torch can go through and be secured. Therefore, in one embodiment, a torque motor device surrounds at least part of the upper portion of the plasma cutting torch to rotate the plasma cutting torch about a central axis of the upper portion (e.g. see FIG. 6B).

Referring to FIG. 1, in one embodiment, the torque motor device (e.g., 810 in FIG. 8) is controlled to maintain the non-angled side 155 of the lower portion 115 of the torch 100 perpendicular to a face of a workpiece being cut during a cutting operation (e.g., see FIG. 4). The torque motor device 810 is controlled by the robot to which the upper portion 110 of the torch 100 is connected via an arm (e.g., via arm 410 in FIG. 4) of the robot. The torque motor device 810 is controlled by the robot as an auxiliary axis of the robot. Positional data is generated to drive the auxiliary axis (i.e., the torque motor device). The auxiliary axis is perpendicular to the direction of the cut, in accordance with one embodiment, and effectively provides a forward and an inverse kinematic. In one embodiment, the configuration allows for contouring curves/splines close to a wall of a beam or a round pipe, for example.

In one embodiment, the torque motor device 810 is configured to rotate the plasma cutting torch 100 at least 360 degrees in either direction (e.g., clockwise and counter-clockwise) about the central axis 114 of the upper portion 110. A flexible coupling is provided, in one embodiment, on the back end of the torch 100 to allow rotation of the torch 100 such that torch leads of a lead harness to the torch 100 do not have to be unwound. The torch leads may provide, for example, gas, coolant fluid, and electricity to the torch. The flexible coupling provides an infinite rotational connection between the back end of the torch 100 and the lead harness, removing any freedom-of-movement restrictions.

While the disclosed embodiments have been illustrated and described in considerable detail, it is not the intention to restrict or in any way limit the scope of the claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. For example, alternative methods and/or systems with additional or alternative components may be utilized to configure a plasma cutting torch to allow for accessing otherwise difficult-to-access portions of workpieces for cutting. It is sought, therefore, to cover all such changes and modifications as fall within the spirit and scope of the general inventive concepts, as defined by the claims, and equivalents thereof.

What is claimed is:

1. An eccentric plasma cutting torch configured to get closer in toward otherwise difficult-to-access portions of workpieces for cutting, the torch comprising:
    an upper portion having a first central axis, wherein the upper portion is configured to attach to an arm of a robot;
    a lower portion connected to the upper portion, wherein the lower portion includes a torch tip region providing a plasma outlet opening, an angled side along a length of the lower portion, and a non-angled side along the length of the lower portion, and wherein the angled side results from continuously smaller cross sections of the lower portion along the length which are biased towards the non-angled side; and
    an electrode within the lower portion having a second central axis, wherein the first central axis of the upper portion and the second central axis of the electrode are both along a same longitudinal dimension, and wherein the second central axis is spatially offset from the first central axis, towards the non-angled side of the lower portion of the torch, and is aligned with the plasma outlet opening.

2. The torch of claim 1, wherein the continuously smaller cross sections of the lower portion are elliptical in shape.

3. The torch of claim 1, wherein the continuously smaller cross sections of the lower portion are circular in shape.

4. The torch of claim 1, further comprising a torque motor device secured to at least part of the upper portion, wherein the torque motor device is controlled to maintain the non-angled side of the lower portion perpendicular to a face of a workpiece being cut during a cutting operation.

5. The torch of claim 1, wherein the lower portion includes at least one of a cutting gas inlet channel or a shielding gas inlet channel.

6. The torch of claim 1, wherein the lower portion includes a cooling fluid inlet channel, a coolant reservoir, and a plurality of cooling fins.

7. The torch of claim 1, further comprising a retaining cap.

8. A plasma cutting torch configured to get closer in toward otherwise difficult-to-access portions of workpieces for cutting, the torch comprising:
    an upper portion having a first central axis, wherein the upper portion is configured to attach to an arm of a robot;
    a lower portion connected to the upper portion and having a torch tip region providing a plasma outlet opening; and
    an electrode within the lower portion having a second central axis, wherein the second central axis is at a non-zero degree angle to the first central axis and is aligned with the plasma outlet opening.

9. The torch of claim 8, wherein the lower portion includes at least one of a cutting gas inlet channel or a shielding gas inlet channel.

10. The torch of claim 8, wherein the lower portion includes a cooling fluid inlet channel, a coolant reservoir, and a plurality of cooling fins.

11. The torch of claim 8, further comprising a retaining cap.

12. The torch of claim 8, wherein the non-zero angle is between 10 degrees and 20 degrees.

13. The torch of claim 8, wherein the non-zero angle is between 20 degrees and 30 degrees.

14. The torch of claim 8, wherein the non-zero angle is at least 30 degrees.

15. A plasma cutting torch configured to get closer in toward otherwise difficult-to-access portions of workpieces for cutting, the torch comprising:
    an upper portion having a first central axis and a second central axis, wherein the second central axis is at a first non-zero angle to the first central axis to form a bend in the upper portion, and wherein the upper portion is configured to attach to an arm of a robot;
    a lower portion connected to the upper portion and having a torch tip region providing a plasma outlet opening; and
    an electrode within the lower portion having a third central axis, wherein the third central axis is at a second non-zero degree angle to the second central axis and is aligned with the plasma outlet opening.

16. The torch of claim 15, wherein the lower portion includes at least one of a cutting gas inlet channel or a shielding gas inlet channel.

17. The torch of claim 15, wherein the lower portion includes a cooling fluid inlet channel, a coolant reservoir, and a plurality of cooling fins.

18. The torch of claim 15, wherein at least one of the first non-zero angle and the second non-zero angle is between 10 degrees and 20 degrees.

19. The torch of claim 15, wherein at least one of the first non-zero angle and the second non-zero angle is between 20 degrees and 30 degrees.

20. The torch of claim 15, wherein at least one of the first non-zero angle and the second non-zero angle is at least 30 degrees.

* * * * *